United States Patent [19]

Muryoi et al.

[11] Patent Number: 4,457,591
[45] Date of Patent: Jul. 3, 1984

[54] SINGLE OPERATOR MACRO-FOCUSING ZOOM LENS BARREL

[75] Inventors: Takeshi Muryoi, Chigasaki; Hitoshi Imanari, Funabashi, both of Japan

[73] Assignee: Nippon Kogaku K.K., Tokyo, Japan

[21] Appl. No.: 354,901

[22] Filed: Mar. 4, 1982

[51] Int. Cl.³ .......................... G02B 7/10; G02B 15/18
[52] U.S. Cl. ...................................... 350/430; 350/255
[58] Field of Search .................... 350/430, 429, 255

[56] References Cited

U.S. PATENT DOCUMENTS 4,322,150  3/1982  Kamata et al. ................... 350/430

Primary Examiner—Jon W. Henry
Attorney, Agent, or Firm—Fitzpatrick, Cella, Harper & Scinto

[57] ABSTRACT

A lens barrel enabling the focusing to infinity distance to a short distance by movement of a focusing lens system and enabling magnification change by movement of a variator lens system includes an operating ring rotatable about the optical axis and slidable in the direction of the optical axis, first means for causing the movement of the focusing lens system to respond to the rotation of the operating ring, the operating ring being further rotatable from the rotation for the focusing to the short distance to enable the focusing to a distance shorter than the short distance, and second means for causing the movement of the variator lens system to respond to the sliding movement of the operating ring, the second means including cam means provided between the operating ring and the variator lens system to enable movement of the variator lens system in response to the rotation of the operating ring for the focusing to the distance shorter than the short distance.

4 Claims, 1 Drawing Figure

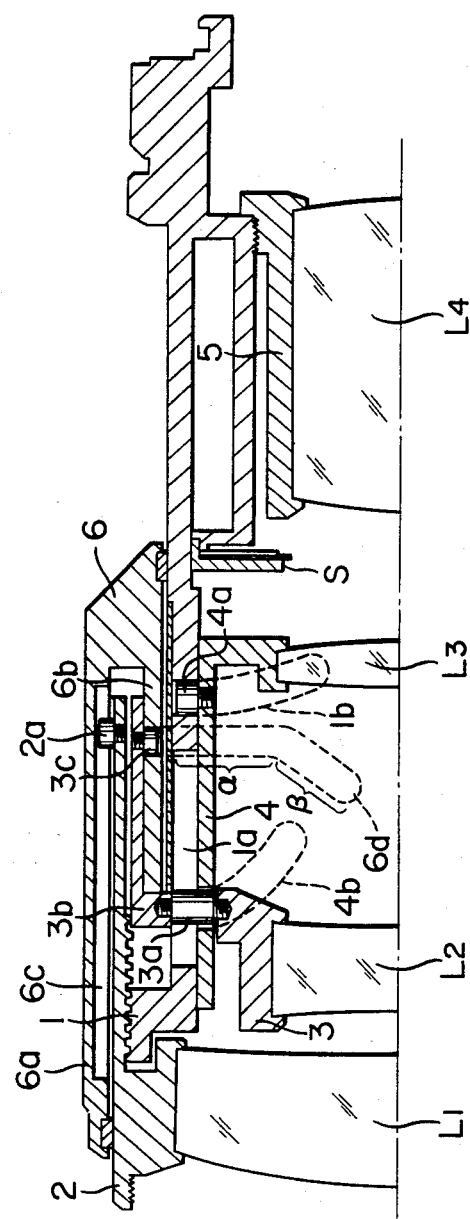

SINGLE OPERATOR MACRO-FOCUSING ZOOM LENS BARREL

BACKGROUND OF THE INVENTION

1. Field of the Invention

This invention relates to a lens barrel, and more particularly to a lens barrel capable of the so-called one-hand zoom in which focusing operation can be accomplished by the rotation of an operating ring about the optical axis and magnification changing operation can be accomplished by the displacement of the operating ring in the direction of the optical axis and capable of focusing operation to a very short distance, namely, macro operation.

2. Description of the Prior Art

What will hereinafter be described is generally known as a lens barrel of this type. That is, at lens barrel which comprises a focusing lens system as a first group, a variator lens system as a second group, a compensator lens system as a third group, and a master lens system as a fourth group and in which, during focusing operation, the focusing lens system is displaced in response to rotation of the operating ring and during magnification changing operation, the variator lens and the master lens are displaced while varying the spacing therebetween in response to displacement of the operating ring. Macro operation is accomplished by further rotating the operating ring beyond the short distance position thereof for focusing to a short distance and displacing the compensator lens system and the focusing lens system with this rotation. More particularly, when the operating ring is rotated beyond the short distance position thereof, the focusing lens system is displaced while, at the same time, an interlocking member operatively associated with the operating ring is coupled to a displacing member for displacing the compensator lens system, so that the rotational force of the operating ring is converted by the displacing member to displace the compensator lens system. When the operating ring is returned to the short distance position, the coupling between the interlocking member and the displacing member is released and therefore, only the focusing lens system is displaced by the rotation of the operating ring between the short distance position and an infinity position in which the system is focused to infinity. This lens barrel has the advantage that one can shift from focusing operation or magnification changing operation immediately to macro operation. This lens barrel, however, requires a clutch mechanism for bringing the interlocking member and the displacing member into and out of engagement with each other at the short distance position as described above, and this has led to the complicated construction of the lens barrel.

SUMMARY OF THE INVENTION

It is an object of the present invention to provide a zoom lens barrel which is excellent in operability and simple in construction as well as capable of macro operation.

In the lens barrel according to the present invention, the focusing lens system is moved in response to rotation of the operating ring and the variator lens system is moved in response to sliding movement of the operating ring in the direction of the optical axis. The operating ring is rotatable for the focusing to a very short distance shorter than the short distance, beyond the rotation range for the focusing from infinity to the short distance, and cam means is provided between the operating ring and the variator lens system to enable the variator lens system to move in response to the rotation of the operating ring for focusing to the very short distance.

In the lens barrel according to the present invention, the focusing lens is also displaced with displacement of the compensator lens and this is advantageous for designing an optical system having little astigmatism.

The invention will become more fully apparent from the following detailed description thereof taken in conjunction with the accompanying drawing.

BRIEF DESCRIPTION OF THE DRAWING

The drawing shows a cross section of an embodiment of the lens barrel according to the present invention.

DESCRIPTION OF THE PREFERRED EMBODIMENT

Referring to the drawing, a first holding cylinder 2 having a focusing lens $L_1$ inserted therein is screwed on the outer periphery of the left end of a fixed cylinder 1. A connecting pin 3a studded in a second holding cylinder 3 having a variator lens $L_2$ inserted therein extends through a straight groove 1a formed in the fixed cylinder 1 in the direction of the optical axis, whereby the second holding cylinder 3 is displaceable in the direction of the optical axis. A pin 4a studded in the outer periphery of a third holding cylinder 4 having a compensator lens $L_3$ inserted therein is fitted in a spiral groove 1b formed in the fixed cylinder 1 about the optical axis, whereby the third holding cylinder 4 is rotatable and slidable. A fourth holding cylinder 5 having a master lens $L_4$ inserted therein is fixedly screwed in the inner periphery of the right end of the fixed cylinder 1. An operating ring 6 comprises an outer cylindrical portion 6a in slidable contact with the outer periphery of the first holding cylinder 2, and an inner cylindrical portion 6b in slidable contact with the outer periphery of the fixed cylinder 1, and is rotatable and slidable. A straight groove 6c is formed in the inner periphery of the outer cylindrical portion 6b, and a pin 2a studded in the outer periphery of the right end of the first holding cylinder 2 is fitted in the straight groove 6c. Accordingly, the first holding cylinder 2 and the operating ring 6 are independent of each other with respect to the displacement in the direction of the optical axis and are in integral relationship with each other with respect to the rotation about the optical axis. A pin 3c is studded in the inner periphery of the right end of an arm 3b made integral with the second holding cylinder by the connecting pin 3a and in slidable contact with the outer periphery of the inner cylindrical portion 6b. This pin 3c is fitted in a cam slot 6d provided in the inner cylindrical portion 6b. The cam slot 6d comprises a circumferential slot α formed circumferentially about the optical axis and a spiral slot β continuous thereto. Accordingly, as long as the pin 3c is fitted in the circumferential slot α, the second holding cylinder 3 and the operating ring 6 are independent of each other with respect to the rotation and are in integral relationship with each other with respect to the displacement in the direction of the optical axis. The connecting pin 3a of the second holding cylinder 3 further extends through a spiral groove 4b formed in the inner periphery of the third holding cylinder 4. A stop S is disposed in the inner periphery of the fixed cylinder 1 between the compensator lens $L_3$ and the master lens $L_4$. Focusing operation may be accomplished by rotating the operating ring 6 after a desired object to be photographed has been determined. Thereupon, through the engagement between the straight groove 6c and the pin 2a, the focusing lens $L_1$ rotates with the operating ring 6 and is displaced in the direction of the optical axis by the threaded engagement between the first holding cylinder 2 and the fixed cylinder 1. When focusing has been effected to the object to be photographed, the rotation thereof may be stopped. In the focusing operation of the operating ring 6 with respect to objects lying at infinity to a short distance, the circumferential slot $\alpha$ of the cam slot 6d transmits no drive force to the pin 3c and therefore, the variator lens $L_2$ is not displaced.

Magnification changing operation may be accomplished by sliding the operating ring 6 in the direction of the optical axis. In the drawing, the lenses $L_2$ and $L_3$ are in the positional relation when this lens system forms the widest angle of view. When the operating ring 6 is displaced rightwardly as viewed in the drawing, the lens $L_2$ is displaced with the operating ring 6 in the same direction along the straight groove 1a of the fixed cylinder 1 through the engagement between the pin 3c and the circumferential slot $\alpha$. With this displacement, the compensator lens $L_3$ is rotated by the engagement between the connecting pin 3a of the second holding cylinder 3 and the spiral groove 4b of the third holding cylinder 4. By this rotation, the pin 4a slides along the spiral groove 1b of the fixed cylinder 1, so that the lens $L_3$ is displaced in the direction of the optical axis. With this displacement, the angle of view formed by this lens system becomes narrower. By this displacement of the lens $L_3$, focused condition is kept even during magnification changing operation.

The marcro operation for focusing the lens system to a very close object may be accomplished by rotating the operating ring 6 beyond a short distance position. By this rotation, the focusing lens $L_1$ is also displaced somewhat in the direction of the optical axis while, at the same time, the spiral slot $\beta$ pushes the pin 3c of the second holding cylinder 3 leftwardly as viewed in the drawing. Thereby, the variator lens $L_2$ is displaced along the straight groove 1a of the fixed cylinder 1. With this displacement, the lens $L_3$ is also somewhat displaced. However, this displacement of the lens $L_3$ need not always be effected. The rotation of the operating ring 6 is stopped when focusing has been accomplished to a desired close object.

We claim:

1. A lens barrel including a focusing lens system and a variator lens system, thereby enabling focusing from infinity to a short distance, focusing from a short distance to a very short distance shorter than the short distance and magnification change, said lens barrel comprising:
    (a) an operating ring rotatable about an optical axis within a predetermined range for the focusing from infinity to the short distance, further rotatable beyond said predetermined range for the focusing from the short distance to the very short distance and slidable in the direction of the optical axis for the magnification change;
    (b) first interlocking means for moving said focusing lens system in the direction of the optical axis in response to the rotation of said operating ring;
    (c) second interlocking means for sliding said variator lens system in the direction of the optical axis integrally with said operating ring in response to the sliding movement of said operating ring;
    (d) a third interlocking means for making said variator lens system independent of said operating ring with respect to the rotation of said operating ring within said predetermined range and sliding said variator lens system in the direction of the optical axis in response to the rotation of said operating ring beyond said predetermined range; and
    (e) means for blocking rotation of said variator lens system about the optical axis.

2. A lens barrel according to claim 1, further comprising a first holding member for holding said focusing lens system and a second holding member for holding said variator lens system, and wherein said third interlocking means include cam means provided between said operating ring and said second holding member and wherein said cam means has a circumferential surface extending in a circumferential direction and having no amount of displacement in the direction of the optical axis and an inclining surface having an amount of displacement in the direction of the optical axis and continuous to said circumferential surface.

3. A lens barrel including a focusing lens system and a variator lens system, thereby enabling focusing from infinity to a short distance, focusing from a short distance to a very short distance shorter than the short distance and magnification change, said lens barrel comprising:
    (a) a stationary ring member;
    (b) an operating ring rotatable about an optical axis within a predetermined range for the focusing from infinity to the short distance, further rotatable beyond said predetermined range for the focusing from the short distance to the very short distance and slidable in the direction of the optical axis for the magnification change;
    (c) a first holding ring for holding said focusing lens system, said first holding ring being in threaded engagement with said stationary ring member;
    (d) a second holding ring for holding said variator lens system, said second holding ring being coupled to said stationary ring member so that a rotation about the optical axis of the second holding ring be blocked;
    (e) means for coupling said first holding ring integrally to said operating ring with respect to the rotations thereof; and
    (f) cam means for coupling said second holding ring to said operating ring, said cam means having a circumferential surface extending in a circumferential direction and having no amount of displacement in the direction of the optical axis and an inclining surface having an amount of displacement in the direction of the optical axis and continuous to said circumferential surface, said operating ring being coupled to said second holding ring in said circumferential surface during the rotation within said predetermined range and being coupled to said second holding ring in said inclining surface during the rotation beyond said predetermined range.

4. A lens barrel according to claim 1, further including a compensator lens system movable in the direction of the optical axis in response to the movement of said variator lens system to keep the focusing during the movement of said variator lens system for said magnification change.

* * * * *

UNITED STATES PATENT AND TRADEMARK OFFICE
CERTIFICATE OF CORRECTION

PATENT NO. : 4,457,591

DATED : July 3, 1984

INVENTOR(S) : TAKESHI MURYOI, ET AL.

It is certified that error appears in the above-identified patent and that said Letters Patent is hereby corrected as shown below:

In The Headnote:

Between items [22] and [51] insert the following priority data:

--[30]     Foreign Application Priority Data

March 11, 1981 [JP]  Japan ............... 56-35007--

Column 1, line 18, "at" should be --a--.
Column 4, line 3 (Claim 1, line 21), delete "a".

Signed and Sealed this

Eighteenth Day of December 1984

[SEAL]

Attest:

GERALD J. MOSSINGHOFF

Attesting Officer

Commissioner of Patents and Trademarks